United States Patent [19]

Bradbury

[11] 4,148,386
[45] Apr. 10, 1979

[54] CONVEYOR ROLLER MOUNTING DEVICE WITH CURVED SURFACES

[75] Inventor: Bernard G. Bradbury, Chico, Calif.

[73] Assignee: Rexnord Inc., Milwaukee, Wis.

[21] Appl. No.: 878,633

[22] Filed: Feb. 17, 1978

[51] Int. Cl.² .................. B65G 13/00; B65G 39/00
[52] U.S. Cl. ............................................... 193/37
[58] Field of Search .............. 193/37, 35 R; 198/780; 308/20, 189 R, 194, 195; 29/116 R, 116 AD

[56] References Cited

U.S. PATENT DOCUMENTS

| | | | |
|---|---|---|---|
| 2,031,618 | 2/1936 | Robins | 308/194 |
| 2,073,957 | 3/1937 | Brouwer | 308/194 X |
| 2,141,810 | 12/1938 | Carroll | 308/20 |
| 2,951,396 | 9/1960 | Kooistra | 308/194 X |
| 4,059,180 | 11/1977 | Krivec et al. | 193/37 |

Primary Examiner—Robert B. Reeves
Assistant Examiner—James L. Rowland

[57] ABSTRACT

An improved roller mount comprising a short stub axle, having a surface configuration such that contact with the inner bore wall is limited to line contact perpendicular to the longitudinal axis of the bore. Such contact permits relative motion about the line thereby minimizing tilt and subsequent binding of the inner bearing cone against the rotating elements of the bearing.

4 Claims, 9 Drawing Figures

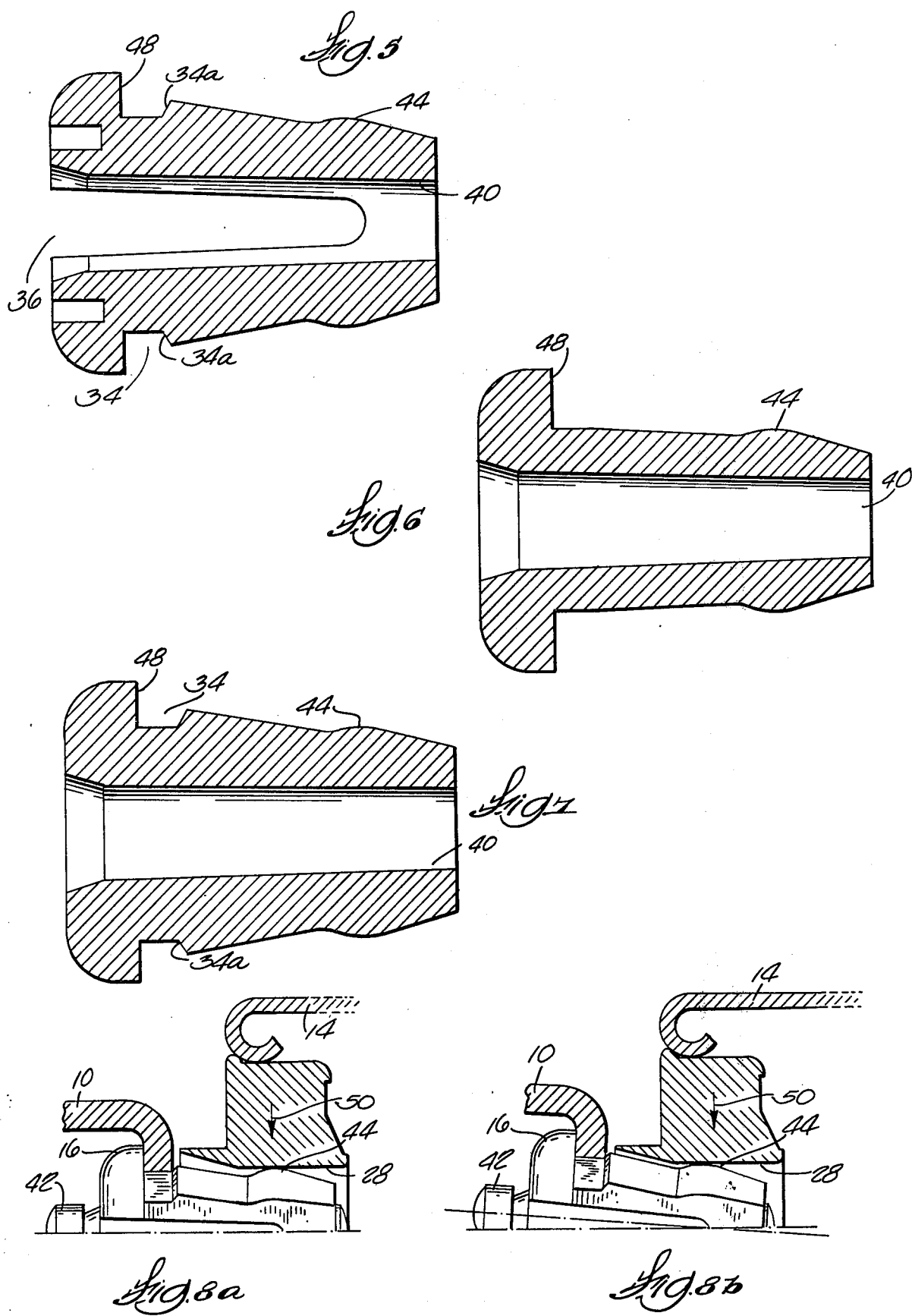

CONVEYOR ROLLER MOUNTING DEVICE WITH CURVED SURFACES

BACKGROUND OF THE INVENTION

Most of the roller conveyors presently being manufactured utilize shafts or axles with hexagonal cross-sections to mount the rollers between support frames. Each roller is supplied with a pair of bearing assemblies, one for each end which have a complimentary bore for the axle. Similarly, the support structures have openings with identical sections. The primary purpose for the polygonal cross-sections is to prevent the rotation of the inner cone of the bearing assembly about which the spherical elements of the assembly are disposed.

The cost of producing polygonal axles is high due to both the cost of material and the shape of the axle. Attempts have been made to replace the single axle per roller with a pair of short stub axles, one for each end of a roller. From a cost standpoint, the use of such shorter axles to reduce the amount of material used is economical. There are, however, severe functional disadvantages which must be weighed against the beneficial economics. Perhaps the most critical disadvantage is the inability of the prior art stub axles to perform properly under increasingly heavy loads or when there is slight misalignment of the support frame structure.

It has been noted that stub axles under such circumstances tend to cause a distortion or tilting of the inner cone relative to the bearings. This distortion causes the cone to press directly against the balls of the bearing, which ordinarily is separated by a thin film of friction-reducing lubricant, and greatly increasing frictional problems. While most bearings tolerate a certain amount of tilting, for example, about one degree relative to the vertical, the tilting due to misaligned frames or axle deflection due to heavy loads would exceed this amount were it not for the loose fit of the single axle in the support frame structure openings and bore of the bearing assembly.

Because a stub axle is positioned only by one frame, and therefore fixed at a single point, it is necessary that the axle be secured firmly to the frame with its axis perpendicular to the frame. Otherwise, the axle would always pivot downwardly even under the weight of an unloaded roller. Thus, the loose fit needed to compensate for misalignment and/or deflection cannot be provided by the stub axle. This means that the use of stub axles are presently limited to special situations where the loads are extremely light and frame alignment is carefully assured.

Therefore, the paramount object of the present invention is to provide an improved roller conveyor mount using a stub axle which performs satisfactorily under varying loads and frame misalignments normally experienced in commercial operations.

SUMMARY OF THE PRESENT INVENTION

The present invention comprises an improved roller conveyor mount which supports the roller elements of the conveyor between the parallel frames support structures. The improved mount, in part is a short stub axle fixedly mounted in the support structures and have an elongated body which when inserted into the bore of the bearing assembly of each roller contacts and provides support to the bearing assembly through the bore. That portion of the axle body which contacts the bore wall is largely confined to a plane essentially perpendicular to the bore axis and is positioned beneath the region of the bore through which the load force is directed. This configuration and positioning then forms a non-coupling support for the inner cone and permits relative motion between the bearing assembly and stub axle.

In one preferred embodiment, the contacting surface of the stub axle has a surface comprised of a plurality of cylindrical segments of the same radius of curvature which are, in effect, each mounted on and raised above the surfaces of a hexagonal axle. The axis of each cylindrical segment is substantially perpendicular to the longitudinal axis of the stub, and therefore, bore. The cylindrical segments contact the upper wall of the bore (also having a hexagonal cross-section) along at least one line, preferably two lines, perpendicular to the longitudinal axis of the bore. The contact between bore and stub being along lines substantially perpendicular to the stub axle permits relative motion about the lines. Such motion is highly desireable to prevent the inner cone from tilting and binding against the rotating elements of the bearings, which in turn would greatly increase rotational friction in the roller assembly.

BRIEF DESCRIPTION OF THE DRAWINGS

FIG. 5 is a view taken along lines 5—5 of FIG. 4.

FIG. 6 is a view taken along lines 6—6 of FIG. 4.

FIG. 7 is a view taken along lines 7—7 of FIG. 4.

FIGS. 8(a) and 8(b) are schematic views, respectively, illustrating the orientation of the stub axle in aligned and misaligned positions.

DESCRIPTION OF THE PREFERRED EMBODIMENT

Figure 1:
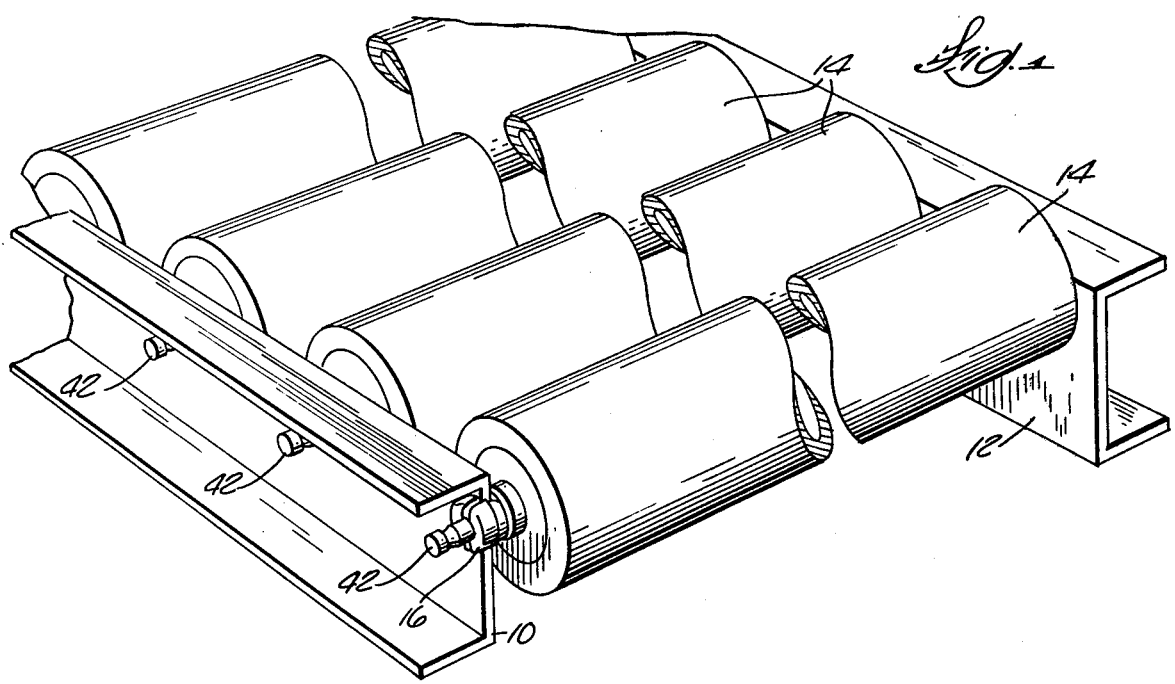
FIG. 1 is a perspective of a typical conveyor in which the present invention may be used.
Figure 4:
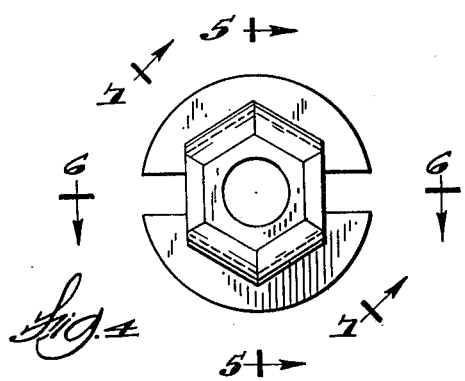
FIG. 4 is an end view of a stub axle looking forward toward the head end in accordance with the present invention.

FIG. 1 is a perspective view of a conveying apparatus having a pair of spaced support frames 10, 12 providing support to rollers 14. Rollers 14 collectively define a surface over which a load may be transported. Each of frames 10, 12 are generally constructed of sheet material of a predetermined thickness. Variations in thickness may occur, however, among the many types of conveying apparatus, primarily in relationship to the weight of the loads carried and the desired portability of the apparatus.

In general, most conveying apparatus of the type shown in FIG. 1 utilize a single axle for each roller, which extends the entire length thereof and is secured at each end to the support frames. The apparatus of FIG. 1 discloses instead a plurality of stub axles 16, one for each end of roller 14. Only the head portions of stubs 16 are shown.

For purposes herein, it is immaterial whether load objects are moved manually, by gravity in the case of an inclined apparatus, or powered means, such as a moving belt tangently contacting the undersurface of the rollers. The invention as defined herein can be employed equally well with roller conveyors of all types.

Figure 2:
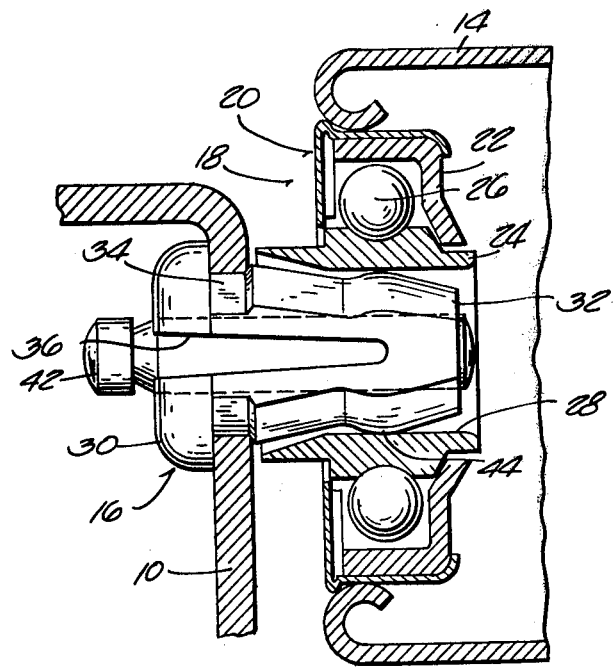
FIG. 2 is a side view in section partially broken away, depicting a stub axle supporting and positioned within a typical conveyor roller assembly.

FIG. 2 illustrates in partial section a preferred embodiment of the present invention. A portion of a roller 14 is shown with a typical bearing assembly 18 positioned in the end thereof. Bearing assembly 18 contains the usual components such as wall 20, outer cone 22 fixedly secured to wall 20, inner cone 24 confined by wall 20 and cone 22, and a plurality of balls 26 within the cavity defined by cones 22, 24. Inner cone 24 has a bore 28 which in this embodiment may have a hexagonal cross-section.

Bore 28 is adapted to receive an axle with a complimentary hexagonal cross-section. In FIG. 2, axle 16 is shown positioned within bore 28. Axle 16 may generally be described as having two parts or portions: a head end portion 30 which extends from one side of frame 10 through a frame opening to bore 28 and an elongated body portion 32 which extends into bore 28. Body portion 32 has an outer surface which generally diverges or flares outwardly along its length from the end to a recess 34 extending circumferentially about axle 16. Recess 34 engages frame 10 as shown in FIG. 2.

Axle 16 additionally has a pair of slots 36, 38 which extend longitudinally along opposite sides from head portion 30 and terminating short of the end of body portion 32. Slots 36, 38 communicate with a longitudinally extending central opening 40 within axle 16, which opening serves to receive tapered pin 42. As is evident from FIG. 2, the walls of axle 16 increase in thickness to recess 34. The use of pin 42 itself is optional, but is preferred with heavier loads in which greater axle strength is needed. The slight taper of pin 42 which provides an increasingly tight fit in opening 40 is suffaicient to prevent it from being vibrated out during operation.

Figure 3:
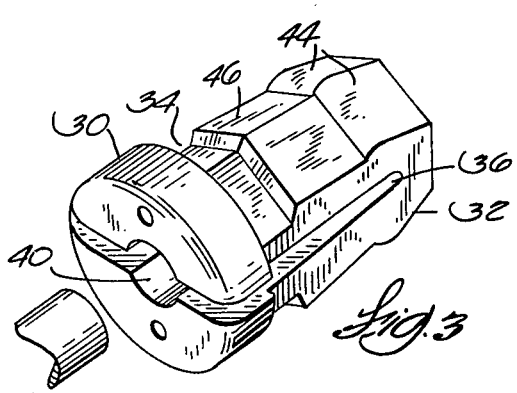
FIG. 3 is a perspective view of a stub axle in accordance with the present invention.

Referring to the perspective view of a stub axle 16 in FIG. 3, it may be seen that axle 16 has a generally hexagonal cross-section although surfaces 46 generally diverge one from another toward the head end portion 30. Located on surfaces 46 are curved raised segments 44 which in the preferred embodiment are portions of cylinders of the same diameter. Each segment 44 is positioned such that the axis of the imaginary cylinders of which each is a part are substantially co-planar and form a plane substantially perpendicular to the axis of axle 16.

When axle 16 is inserted into bore 28 the segments 44 tangentially contact the walls of bore 28 preferably along at least two lines. This is easily accomplished when using hexagonally shaped bore and axle since ordinarily axle 16 is inserted with an apex positioned upwardly. Because of the position of segments 44 with respect to surfaces 46, contact is also substantially in the plane defined by the axes of segments 44. That is, the segments tangentially contact the bore along lines in the same plane as defined by the axes. While the purpose for this contact will be more fully explained below, it should be noted that the contact permits relative movement between axle 16 and bearing assembly 28. To further facilitate such motion, bore 28 may be provided with a diverging cross-section as illustrated in FIG. 2 toward the opening adjacent frame 10. This provides greater clearance between axle 16 and bore 28.

One of the advantages of the stub axle of the present invention is that it can be adapted for use within the tolerance ranges of the sheet materials used for the frame structure. Recess 34 can best be seen in the enlarged sectional view of FIGS. 5 and 7. One wall 34a angles outwardly from the inner wall 48. The dimensions of recess 34 are selected that the width at the bottom thereof is equal to about the lower tolerance level for thickness of sheet material. The upper width of recess 34 is equal to the upper tolerance level. As stub 16 is forced through support frame opening, the walls of stub 16 are cammed inwardly by the flared surfaces 46. Slots 36, 38 facilitate the flexing inwardly of the sides. Once wall 48 contacts frame 10, recess 34 is in position about frame 10 and surfaces 46 are released and return to their original position. Frame 10, however, will deform wall 34a, the degree of which depends upon the thickness of frame 10. The deformation of wall 34a about frame 10 provides for the needed firm positioning of stub axle 16.

Recess 34 does not completely circumscribe axle 16 because of slots 36, 38. This is depicted generally in FIG. 6. Consequently, the positioning of the slots 36, 38 generally determine the orientation of axle 16 within bore 28. Because it is preferred that recess 34 engage frame 10 at a point directly beneath axle 10 to provide a more suitable resistance against the sag of axle 16 under loads, the axle is generally oriented such that a point of the hexagonal cross-section is up with the slots 36, 38 oriented in a horizontal plane. As stated before, this provides two lines of contact against the inner bearing cone.

In assembling a roller conveyor apparatus, it is difficult to always ensure that the support frames are parallel to each other. Consequently, the frame openings are not always aligned. Manufacturers generally ensure that the fit between axles and frame openings are loose enough to compensate for such misalignment so as not to unduly disturb the relationship of the various bearing assembly elements. When employing stub axles, however, this is not generally possible since it is necessary that the stub axle have a tight fit within the frame opening and have a fixed axis with respect to the opening. Thus one stub axle may not be disposed horizontally. Something in the roller conveyor apparatus must necessarily flex enough in order for the rollers to be secured between frames. Too often, it is the bearing assembly which is distorted beyond the manufacturer's prescribed limits by the axle being forced into the bore of the assembly. The result is that the rollers do not turn freely.

In FIG. 8(b), axle 16 is not positioned horizontally because the frame 10 to which it is fixed is not vertical. Even though axle 16 and bore 28 are no longer coaxial, support is still provided along the tangential contact lines between segments 44 and the bore wall. That is, axle 16 can be inserted, even when the frames as misaligned, without causing the inner cone to twist.

Similarly, most commercially available bearings and axle arrangements in conveyor roller assemblies are designed to withstand the axle deflection which occurs under loads. The loose fit between the axle and the bore permits the deflection of the axle within prescribed tolerance limits. Unless the stub axle compensates for deflection, however, the inner cone will be distorted. Because the stub axle of the present invention permits pivoting action of the inner cone and/or axle about the tangential contact line, a normal amount of deflection is allowed without deleterious effect on the bearing assembly.

One important point which must be observed when loading any bearing assembly of the type described herein is that support to the bearing assembly must be distributed such that the resultant upward force exerted by the axle must be in balance with the downward force exerted by the loaded bearing assembly. When the resultant upward force is displaced from the downward force, coupling occurs. This may result in the twisting of parts of the bearing assembly (such as the inner cone) relative to other parts greater than the design limits of the assembly thus considerably reducing the effectiveness of the assembly. Because the mounting apparatus of the present invention utilizes line contact, it is important that the contact line or lines be positioned such that the resultant upward force exerted by axle 16 and the downward force of loaded bearing assembly 18 provide a balanced set of forces, i.e. a non-coupling system. To accomplish the proper positioning of the contact lines, it is important to select an axle 16 having an appropriate head-to-segment length such that the contact lines are centered beneath the balls 26. As illustrated in FIG. 8(a), the load force shown by arrow 50 is usually directed through the center of balls 26. Therefore, it is desirable to have the segments 44 centered so that the contact between bearing and segment is substantially coplanar with the downward acting load force.

While a preferred embodiment has been set forth above, it should be understood that other modifications, changes, and alterations may be made without departing from the spirit of the invention as defined in the following claims.

I claim:

1. In combination with a roller conveyor having a multiplicity of rollers defining a load bearing surface and being positioned between and rotatably secured to support frames, each roller having a bearing assembly at the ends thereof which define an axle bore having a polygonal cross-section therethrough, a support axle extending through the bore into openings in the adjacent support frames, an improved axle comprising a stub having a predominantly polygonal cross-section for supporting the rollers at each end, said stub portion having a head portion with a diameter larger than the diameter of the frame openings and an elongated body adapted for insertion through the frame openings and into the bore, said body having a plurality of curved surfaces integral with and extending from said elongated body, at least some of said curved surfaces contacting and providing support to the bearing assembly in a plane approximately perpendicular to the bore axis, said curved surfaces supporting the bearing assembly further being positioned at a predetermined location along the bore so as to minimize coupling between the upward force exerted by the axle and the downward force of the bearing assembly.

2. The combination of claim 1 in which the curved surfaces are each segments of cylinders, at least some of which are in contact with and provide support to the bearing assembly along lines within a plane substantially perpendicular to the bore axis, said cylinders having axes which are co-planar.

3. The combination of claim 1 in which said stub axle has a central bore with a circular cross-section of essentially a constant diameter extending the length of said stub, and a pair of slots extending from the head end to a point short of the body end and communicating with said central bore, the wall of said stub having increasing thickness from the body end toward the head end and forming a sloping wall of a recess adjacent said stub axle head, said recess adapted to receive the peripheral portion of the frame about the frame opening when the axle is inserted through the frame opening, said diameter of the stub axle being greater than the diameter of the frame opening about the region adjacent the recess so as to cause the walls of the stub axle to progressively flex inwardly as the axle is moved through the opening and to return to position when the head engages the frame wall.

4. The combination of claim 3 including a tapered pin positioned within the central bore.

* * * * *